United States Patent [19]

Sasaki et al.

[11] 4,383,104

[45] May 10, 1983

[54] PHENOLIC CHELATE RESIN, PROCESS FOR PRODUCING THE SAME, AND METHOD OF RECOVERING HEAVY METAL IONS WITH THE SAME

[75] Inventors: Akio Sasaki, Jyoyo; Yoshiaki Echigo, Uji, both of Japan

[73] Assignee: Unitika Ltd., Amagasaki, Japan

[21] Appl. No.: 246,770

[22] Filed: Mar. 23, 1981

[30] Foreign Application Priority Data

Mar. 22, 1980 [JP] Japan .................................. 55-36358

[51] Int. Cl.$^3$ .......................... C08G 8/16; C08G 8/18
[52] U.S. Cl. ..................................... 528/148; 210/688; 210/698; 210/912; 423/7; 423/21.5; 423/24; 423/54; 423/63; 423/100; 423/112; 528/149; 528/158
[58] Field of Search ...................... 528/149, 148, 158; 210/688, 698

[56] References Cited

U.S. PATENT DOCUMENTS

| | | | |
|---|---|---|---|
| 2,546,938 | 3/1951 | Bauman et al. | 528/158 X |
| 3,935,098 | 1/1976 | Oda et al. | 528/147 X |
| 3,936,399 | 2/1976 | Hirai et al. | 210/688 X |
| 4,197,391 | 4/1980 | Uejima et al. | 528/155 X |
| 4,250,031 | 2/1981 | Uejima et al. | 528/155 X |
| 4,266,045 | 5/1981 | Uejima et al. | 528/161 |
| 4,284,512 | 8/1981 | Hodgkin | 528/158 X |

OTHER PUBLICATIONS

Anal. Chem., vol. 46, No. 4, Apr. 1974, pp. 489–492, Sugawara et al.

*Primary Examiner*—Howard E. Schain
*Attorney, Agent, or Firm*—Sughrue, Mion, Zinn, Macpeak and Seas

[57] ABSTRACT

The phenolic chelate resin has a chelate-forming group wherein part or all of the hydrogen atoms in a primary and/or secondary alkylamino group introduced in a phenol nucleus are replaced by a methylenephosphonate group. Also disclosed is a process for producing such a chelate resin, and a method for recovering heavy metal ions with such a resin. The resin has particularly high selectivity for adsorbing uranium ions, as well as high heat, acid and alkali resistance as well as dimensional stability. The resin is very effective for recovering uranium from various uranium-containing solutions such as sea water, crude phosphoric acid fertilizer solutions, lowgrade uranium ore, waste water from uranium refining, and uranium mine water.

11 Claims, No Drawings

PHENOLIC CHELATE RESIN, PROCESS FOR PRODUCING THE SAME, AND METHOD OF RECOVERING HEAVY METAL IONS WITH THE SAME

FIELD OF THE INVENTION

This invention relates to a novel phenolic chelate resin, a process for producing the same, and a method of recovering heavy metal ions with such resin.

BACKGROUND OF THE INVENTION

Several reports have been made on chelate resins having high-molecular compound ligands capable of forming a complex with a heavy metal ion. Commercially available chelate resins having an iminodiacetate group include Dowex A-1 (Dow Chemical Co.), Diaion CR-10 and 20 (Mitsubishi Chemical Industries Limited), and UNICELLEX UR-10, 20 and 30 (UNITIKA Ltd.). But these resins possess a very low selectivity for adsorbing metal ions, especially uranium ions. Many studies have been made on chelate resins having a phosphonate group. For example, Zh. Anal. Khim., Vol. 28, p. 2324, 1973 discloses a chelate resin having phosphonate and iminodiacetate residues, and Anal. Chem., Vol. 46, p. 489, 1974 discloses a chelate resin having phosphonate and alcohol residues. The disclosed resins having a phosphonate group still do not possess satisfactorily high selectivity for uranium ions and have proved virtually useless in recovering uranium from sea water and from crude phosphoric acid solutions used for fertilizer. Zh. Anal. Khim., Vol. 29, p. 1284, 1974 discloses a styrene chelate resin of the iminodiethylene phosphonic acid type together with data on its selective adsorption of uranium ion. But the production of iminodiethylene phosphonic acid used as a starting material for the reported resin is expensive and involves a long and complex process. Hence, the resin is practically unsuitable for use in industry.

SUMMARY OF THE INVENTION

An object of this invention is to provide a phenolic chelate resin which has particularly high selectivity for adsorbing uranium ions and which is stable both chemically and physically, as well as a process for producing such a resin.

Another object of this invention is to provide a method for isolating heavy metal ions by bringing said chelate resin into contact with a solution containing the ions.

Extensive research has been carried out to achieve these objects and discover a chelate resin having high selectivity for adsorbing special heavy metal ions, especially uranium ions. The chelate resin can be obtained easily and economically from a compound prepared by introducing a phosphonate group in a specific amino group in a compound which also has a phenolic hydroxyl group. The invention described below has been accomplished as a result of this finding.

This invention provides a phenolic chelate resin having a chelate forming group wherein part or all of the hydrogen atoms in a primary and/or secondary alkylamino group introduced in a phenol nucleus are replaced by a methylenephosphonate group. The invention also provides a process for producing such phenolic chelate resin which comprises a step wherein a compound having a phenolic hydroxyl group and a primary and/or secondary alkylamino group in the same molecule is reacted with phosphorous acid and formaldehyde in the presence of a mineral acid (this reaction is hereunder referred to as a first stage reaction) to form a reaction product. During the reaction, part or all of the hydrogen atoms in the alkylamino group are replaced by a methylenephosphonate group. The reaction also involves a step wherein the resulting reaction product is condensed with a phenol and an aldehyde (this reaction is hereunder referred to as a second stage reaction). The invention further provides a method of recovering heavy metal ions from an aqueous solution by their selective adsorption on the phenolic chelate resin.

The phenolic chelate resin of this invention is produced by a simple and economical process. The resin has high adsorption selectivity for special heavy metal ions, particularly uranium ions. The resin can be used as many times as required by simple regeneration with an acid, alkali or alkali metal salt. Hence, it is a novel resin that can be used in applications where the conventional phenolic chelate resins are unsuitable

DETAILED DESCRIPTION OF THE INVENTION

The formaldehyde that is used in the first stage reaction in the process of this invention includes a substance that generates formaldehyde, such as paraformaldehyde or hexamethylenetetramine. The formaldehyde may be used in a gaseous form or as an aqueous solution.

The phosphorous acid used in the first stage reaction in the process of this invention includes a substance that generates phosphorous acid under the conditions of the first stage reaction, such as triethylphosphite or dibutylphosphite.

The compound having a phenolic hydroxyl group and a primary and/or secondary alkylamino group in the same molecule (this compound is hereunder referred to as an amino-having phenol compound) that is used in this invention may be selected from among all compounds having a phenolic hydroxyl group and a primary and/or secondary alkylamino group in the same molecule. Preferred examples are a compound such as salicylamine, tyramine or p-hydroxybenzylamine that is represented by the formula (I):

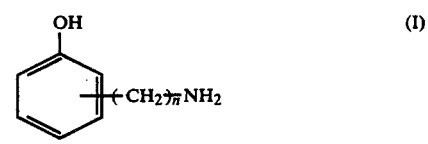 (I)

wherein n is an integer of 1 to 20, preferably an integer of 1 or 2 and which has a phenolic hydroxyl group and a primary alkylamino group in the same molecule; a compound such as tyrosine, o-hydroxyphenylglycine, or p-hydroxyphenylglycine that is represented by the formula (II):

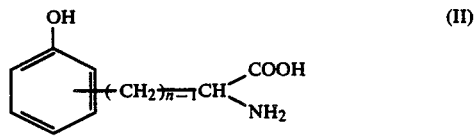 (II)

wherein n is an integer of 1 to 20, preferably an integer of 1 or 2 and which has a phenolic hydroxyl group and a primary alkylamino group in the same molecule; a compound such as 2,4'-dihydroxydibenzylamine or 4,4'-dihydroxydibenzylamine that is represented by the formula (III):

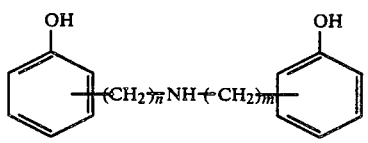

wherein n and m are each an integer of 1 to 20, preferably n and m are each 1 and which has a phenolic hydroxyl group and a secondary alkylamino group in the same molecule; a compound such as ammonia resol that is prepared by reacting ammonia with a phenol and aldehyde and which has a phenolic hydroxyl group and primary and secondary alkylamino groups in the same molecule; and a compound such as a polyethyleneimine/phenol/formalin condensate that is prepared by reacting polyethyleneimine with a phenol and aldehyde which has a phenolic hydroxyl group and primary and secondary alkylamino groups in the same molecule. Another suitable example is a compound of the formula (IV):

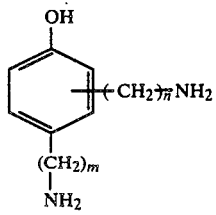

wherein n and m are each a positive number of 1 to 20 and two hydrogen atoms on the benzene nucleus are replaced by an alkyl amino group. Most preferred examples of the above-described amino-having phenol compounds are tyrosine and ammonia resol.

Examples of the phenol that is used in this invention include (1) phenol, (2) an alkyl substituted monovalent phenol such as o-cresol, m-cresol, p-cresol, 2,3-xylenol, 2,5-xylenol, 3,5-xylenol, alpha-naphthol, beta-naphthol, o-ethylphenol, m-ethylphenol or p-ethylphenol, and (3) a bivalent phenol such as catechol, resorcin, or bisphenol A, and (4) a trivalent phenol such as pyrogallol or phloroglucin.

Examples of the aldehyde used in the second stage reaction include an aliphatic saturated aldehyde such as formaldehyde, acetoaldehyde or propionaldehyde; an aromatic aldehyde such as benzaldehyde or salicylaldehyde; a heterocyclic aldehyde typified by furfural; and a formaldehyde derivative such as paraformaldehyde or hexamethylenetetramine. These aldehydes may be used alone or in combination.

An example of the process for producing the chelate resin of this invention is described below. In the first stage reaction, an amino-having phenol compound is reacted with phosphorous acid and formaldehyde at 80° to 120° C. in the presence of a mineral acid such as hydrochloric acid or sulfuric acid. This reaction is carried out in order to replace part or all of the hydrogen atoms of the alkylamino group by a methylenephosphonate group. In the second stage reaction, the reaction product obtained in the first stage reaction (this reaction product is hereunder referred to as an iminomethylenephosphonic acid derivative) is condensed with a phenol and aldehyde at between 30° and 200° C. (preferably between 50° and 130° C.). The condensation is carried out in the presence of a mineral acid or an alkali compound such as sodium hydroxide, potassium hydroxide or ammonia. Before condensation in the second stage reaction, the iminomethylene-phosphonic acid derivative produced in the first stage reaction may be isolated from the reaction mixture. If the condensation in the second stage reaction is performed in a suspension of the iminomethylene-phosphonic acid derivative in a solvent which is substantially soluble in water, a phenolic chelate resin created forms a bead. In the first stage reaction, the amino-having phenol compound, phosphorous acid and formaldehyde are used in a molar ratio of 1:0.9n–1.5n:0.9n–5n, preferably 1:1.0n–1.3n:1-.1–3.5n (wherein n is the number of hydrogen atoms bonded directly to nitrogen atoms contained in one molecule of the amino-having phenol compound. In the second stage reaction, 0.5 to 10 mols, preferably 5 to 8 mols, of the aldehyde is used per mol of the amino-having phenol compound, and 0.1 to 5 mols, preferably 1 to 2.5 mols, of the phenol is used per mol of the amino-having phenol compound. Examples of the substantially water-insoluble solvent used in the second stage reaction include a saturated or unsaturated aliphatic hydrocarbon such as hexane, octane or octyne, an alicyclic hydrocarbon such as cyclohexane or decalin, an aromatic hydrocarbon such as benzene or toluene, and a halogenated hydrocarbon such as dichloroethane or dichlorobenzene. Part or all of the hydrogen atoms of these saturated and unsaturated hydrocarbons, alicyclic hydrocarbons and aromatic hydrocarbons are substituted by chlorine, fluorine or bromine. These solvents may be used alone or as a mixture.

The phenolic chelate resins of this invention may be used either independently or on a porous carrier such as activated carbon or zeolite, or in admixture with such porous carrier. Furthermore, the resins may be used in combination with other ion-exchange resins or chelate resins.

The phenolic chelate resins of this invention may be used in any form such as beads, powder, lumps, plates, membrane, rings or filaments. Usually, it is used in the form of beads.

The chelate resins of this invention exhibit high selectivity for adsorbing heavy metal ions, particularly uranium ions. Hence, they can be used effectively in recovery of uranium from all kinds of uranium-containing solutions. The resins are especially useful in recovering uranium ions from low-concentration uranium solutions such as sea water, crude phosphoric acid solutions used for fertilizer, uranium mine water, waste water from uranium refining, and impress leacheate.

When the chelate resin of this invention is brought into contact with an uranium-containing solution, the iminodi(methylenephosphonate) group or iminomethylenephosphonate group forms a chelate with an uranium ion. The chelate has a high stability constant, and allows for effective, fast adsorption of uranium ions. The chelate resin of this invention is also applicable to selective recovery of other valuable heavy metal ions such as copper, nickel, zinc, cobalt, beryllium, yttrium, tungsten, vanadium and molybdenum.

The resin of this invention can be used in various methods depending upon its form. In one method, a solution containing uranium or other heavy metals is passed through a column or tower packed with the resin. In another method, the resin is immersed in such solution. The temperature of the solution containing uranium or other heavy metals is usually between 5° and 95° C., preferably between 15° and 50° C. Heavy metal ions are kept in contact with the resin for a period of 1 minute to 50 hours, preferably from 10 minutes to 2 hours. The heavy metal ions can be desorbed from the resin of this invention simply by bringing the resin into contact with an aqueous solution of a mineral acid or an aqueous solution of alkali as in the case of desorption from commercial chelate resins or ion-exchange resins. Useable acids include: hydrochloric acid, sulfuric acid, nitric acid or phosphoric acid. The resin regenerated in this manner can be reused. Uranium ions can be effectively desorbed from the chelate resin of this invention with an aqueous solution of phosphoric acid or phosphates such as potassium primary phosphate, sodium primary phosphate, sodium secondary phosphate and potassium secondary phosphate; an aqueous solution of carbonates such as sodium carbonate and potassium carbonate; or an aqueous solution of hydrogencarbonate such as sodium hydrogencarbonate.

As discussed above, the phenolic chelate resins of this invention possess high selectivity for adsorbing special heavy metal ions, particularly for adsorbing uranium ion. The resin can be used as many times as desired by simple regeneration with acid, alkali, or alkali metal salt. Hence, the resin is a novel one that can be used in applications where the conventional phenolic chelate resins are not effective.

This invention is now described in greater detail by reference to the following examples which are given here for illustrative purposes only and are by no means intended to limit the scope of the invention.

EXAMPLE 1

A mixture of 1 mol of tyrosine and 2 mols of phosphorous acid was dissolved in a 20% aqueous HCl solution. The solution was refluxed under stirring while 6 mols of 37% aqueous formalin was added dropwise over a period of 1 hour, followed by stirring of the mixture under reflux for an additional one hour. The mixture was cooled to room temperature and condensed with 2 mols of phenol and 4 mols of 37% formalin for 3 hours at between 90° and 95° C. After the condensation, the reaction product was finely divided, washed with water, and heated in an air bath (110°–120° C.) for 5 hours to give a powdered chelate resin.

EXAMPLE 2

One mol of tyrosine, 2 mols of phosphorous acid and 6 mols of 37% formalin were reacted with each other as in Example 1. A 40% aqueous NaOH was added to the reaction mixture to provide a strong alkali solution. The solution was mixed with 1.5 mols of phenol and 5 mols of formalin, and the mixture was heated at 90° C. for one hour to give a gelled product. The product was then ground into particles, washed with water to remove excess formalin, and heated in an air bath (110°–120° C.) for 5 hours to give a powdered chelate resin.

EXAMPLE 3

A mixture of 1 mol of phenol, 1 mol of 37% formalin and 1 mol of 30% ammonia was heated at 40° C. for one hour to provide ammonia resol. To the ammonia resol, 2 mols of phosphorous acid and conc. hydrochloric acid were added to provide a strong acidic solution. To the resulting solution, 6 mols of formalin was added as in Example 1. The solution was subsequently crosslinked with 2 mols of phenol and 4 mols of formalin as in Example 1 to provide a powdered chelate resin.

EXAMPLE 4

Each of the resins prepared in Examples 1, 2 and 3 was put in an aqueous solution containing 1000 ppm of uranyl nitrate, and the mixture was shaken for 24 hours. The amount of uranyl ion adsorbed on the respective resins was determined by measuring the concentration of residual uranyl ion in the respective mixtures. Measurement of uranyl ion concentration consisted of reduction of uranyl ion with zinc powder, color development with Arsenazo III solution, and determination of absorbance. The results are shown in Table 1.

TABLE 1

| | Adsorption (m mol/g-resin) |
|---|---|
| Ex. 1 | 1.1 |
| 2 | 1.2 |
| 3 | 0.8 |

EXAMPLE 5

One mol of tyrosine, 2 mols of phosphorous acid and 6 mols of 37% formalin were reacted with each other as in Example 2. Caustic soda was added to the reaction mixture to provide an alkaline solution. The solution was mixed with 1.5 mols of resorcin and 5 mols of 37% formalin, followed by addition of n-paraffin under stirring. Under continued stirring, the mixture was heated at 60° C. for one hour, 70° C. for one hour, and at 90° C. for one hour, whereupon the mixture began to gel in a particulate form. The mixture was then transferred to an autoclave where it was heated at 120° C. for 5 hours to complete gelation of the mixture. The resulting particles of resin were isolated from the reaction mixture by filtration, dried with air, washed with water and immersed in a solution of 1 N $H_2SO_4$ to convert the resin from Na type to H type. Upon filtration, beads of chelate resin were obtained.

EXAMPLE 6

A solution (2.0 liters) containing 100 ppm of $UO_2^{2+}$ ion that was adjusted with phosphoric acid to a pH of 1 was passed at a space velocity of 5 $l$/hr through a column packed with 15 cc of the chelate resin prepared in Example 5. After washing with water, 150 cc of 0.5 M aqueous sodium carbonate was passed through the column at a space velocity of 1 $l$/hr to desorb uranium ions. The eluate contained 1130 ppm of uranium ions, and 85% of the uranium in the phosphoric acid solution that was passed through the column was recovered.

EXAMPLE 7

The chelate resin (100 mg) prepared in Example 5 was dissolved in 1 liter of sea water (uranium content =3 μg), and the solution was shaken for 96 hours at room temperature. A radioactivation analysis showed that 2.5 μg of uranium ion was adsorbed on the resin (adsorption efficiency=83%).

COMPARATIVE EXAMPLE 1

A hundred milligrams each of three commercial iminodiacetic acid type chelate resins, Dowex A-1 (Dow Chemical Co.), UNICELLEX UR-10 (UNITIKA Ltd.) and Diaion CR-10 (Mitsubishi Chemical Industries Limited) was contacted by one liter of sea water as in Example 7. The respective uranium recovery efficiencies were 23%, 28% and 25%.

EXAMPLE 8

A solution (2.0 liters) containing 4 ppm of $Be^{2+}$ ion that was adjusted with sulfuric acid to a pH of 2.5 was passed at a space velocity of 5 $l/hr$ through a column packed with 15 cc of the chelate resin prepared in Example 5. After washing with water, 50 cc of 3 N aqueous sulfuric acid was passed through the column at a space velocity of 1 $l/hr$ to desorb beryllium ions. The eluate contained 147 ppm of beryllium ion, and the recovery efficiency was 92%. The beryllium content was determined by the absorptiometric method that used 2-methyloxine.

COMPARATIVE EXAMPLE 2

Beryllium recovery was attempted in the same manner as in Example 8 except that a commercial iminodiacetic acid type chelate resin, Dowex A-1 of Dow Chemical Co., was used. The recovery efficiency was 5%.

While the invention has been described in detail and with reference to specific embodiments thereof, it will be apparent to one skilled in the art that various changes and modifications can be made therein without departing from the spirit and scope thereof.

What is claimed is:

1. A phenolic chelate resin having a chelate-forming group, wherein hydrogen atoms in a primary or secondary alkylamino group introduced in a phenol nucleus are substituted by a methylenephosphonate group.

2. A process for producing a phenolic chelate resin comprising the steps of: reacting a compound having a phenolic hydroxyl group and a primary or secondary alkylamino group in the same molecule with phosphorous acid and formaldehyde in the presence of a mineral acid; allowing the reaction to continue in order to form a reaction product wherein hydrogen atoms in the alkyl amino group are replaced by a methylenephosphonate group; and condensing the resulting reaction product with a phenol and aldehyde.

3. A process as claimed in claim 2 wherein the compound having a phenolic hydroxyl group and a primary alkylamino group in the same molecule is represented by the formula (I):

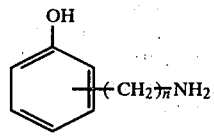

wherein n is an integer of 1 to 20.

4. A process as claimed in claim 2 wherein the compound having a phenolic hydroxyl group and a primary alkylamino group in the same molecule is represented by the formula (II):

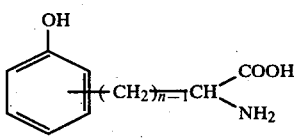

wherein n is an integer of 1 to 20.

5. A process as claimed in claim 2 wherein the compound having a phenolic hydroxyl group and a secondary alkylamino group in the same molecule is represented by for formula (III):

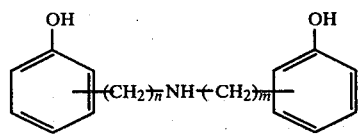

wherein n and m are each an integer of 1 to 20.

6. A process as claimed in claim 2 wherein the compound having a phenolic hydroxyl group and primary and secondary alkylamino groups in the same molecule, is ammonia resol.

7. A process as claimed in claim 2 wherein the compound having a phenolic hydroxyl group and primary and secondary alkylamino groups in the same molecule is a polyethyleneimine/phenol/formalin condensate.

8. A phenolic chelate resin as claimed in claim 1, wherein hydrogen atoms in said primary and said secondary alkylamino group introduced in a phenol nucleus are substituted by a methylenephosphate group.

9. A phenolic chelate resin as claimed in any of claims 1 or 8 wherein all of said hydrogen atoms are substituted by a methylenephosphonate group.

10. A process for producing a phenolic chelate resin as claimed in claim 2, wherein said compound having a phenolic hydroxyl group has a primary and a secondary alkylamino group.

11. A process as claimed in any of claims 2 or 10, wherein all of the hydrogen atoms in the alkylamino group of the reaction product are replaced by a methylenephosphonate group.

* * * * *